United States Patent [19]

Nerowski et al.

[11] Patent Number: 4,906,911
[45] Date of Patent: Mar. 6, 1990

[54] ELECTRICAL MACHINE DRIVEN BY A PULSE-CONTROLLED A.C. CONVERTER

[75] Inventors: Georg Nerowski, Lauf; Bernhard Piepenbreier, Hemhofen; Hans-Juergen Toelle, Erlangen, all of Fed. Rep. of Germany

[73] Assignee: Siemens Aktiengesellschaft, Munich, Fed. Rep. of Germany

[21] Appl. No.: 318,122

[22] Filed: Mar. 2, 1989

[30] Foreign Application Priority Data

Mar. 18, 1988 [DE] Fed. Rep. of Germany ....... 3809202

[51] Int. Cl.$^4$ .............................................. H02P 5/40
[52] U.S. Cl. .................................. 318/807; 318/748; 318/776; 318/732
[58] Field of Search ............... 318/730, 731, 732, 737, 318/807, 748, 776

[56] References Cited

U.S. PATENT DOCUMENTS

| | | |
|---|---|---|
| 3,611,085 | 10/1971 | Rosenberry, Jr. |
| 3,624,472 | 11/1971 | Graham . |
| 4,459,530 | 7/1984 | Klatt .................................. 318/732 |
| 4,536,692 | 8/1985 | Godfroid ............................ 318/723 |
| 4,573,003 | 2/1986 | Lipo .................................. 318/722 |
| 4,634,950 | 1/1987 | Klatt .................................. 318/732 |
| 4,656,410 | 4/1987 | Shibata .............................. 318/732 |

Primary Examiner—David Smith, Jr.
Attorney, Agent, or Firm—Kenyon & Kenyon

[57] ABSTRACT

An electrical machine driven by a pulse-controlled a.c. converter contains multiple phases subdivided into a number of $n \geq 2$ equivalent phases sections that are extensively magnetically decoupled relative to each other. Each phase section is fed by a separate frequency converter. The clocking of the frequency converters for the n phase sections ensues out of phase by an angle of $2\pi/n$ relative to each other phase section.

9 Claims, 1 Drawing Sheet

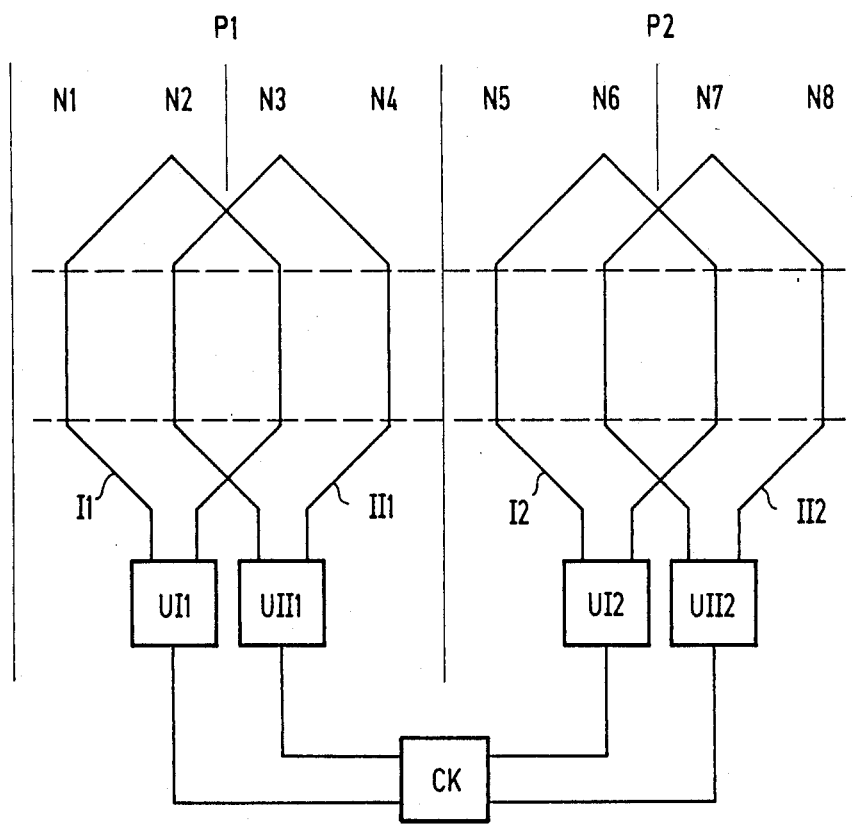

ELECTRICAL MACHINE DRIVEN BY A PULSE-CONTROLLED A.C. CONVERTER

FIELD OF THE INVENTION

The present invention relates to a polyphase electrical machine driven by a pulse-controlled a.c. converter with several frequency converters of equal rating combined to give a total rating equivalent output of the machine.

BACKGROUND OF THE INVENTION

In a polyphase electrical machine, the distribution of the machine performance over several smaller frequency converters is often preferred as a result of redundant demands. The clocking of the individual frequency converters is then associated with the occurrence of noise and oscillating torque. To prevent or remove these unwanted noises and oscillating torques, interphase transformer connections are used in d.c. machines. In these interphase transformer connections, two d.c. chopper controllers that are in phase opposition are attached to an interphase transformer. The interphase transformer feeds the armature winding of the d.c. machine through a central tapping. The additionally required volume, weight and cost of the interphase transformer, however, renders it disadvantageous and impractical.

In twelve-pulse converter-fed motors (with six phases), two three-phase windings offset by 30 degrees are provided, each of which is fed by a three-phase frequency converter. The highest possible number of phases m is thereby limited by the still executable minimum toothpitch $\tau_N$ and depends on the pole pitch $\tau_p$ according to the relation $\tau_N = \tau_p/m$.

Thus, there is a need to provide an electrical machine driven by a pulse-controlled a.c. converter with several frequency converters, that performs without interphase transformers and is not subject to the conditions that limit the highest possible number of phases.

SUMMARY OF THE INVENTION

The above and other problems are solved according to the invention by providing a polyphase electrical machine driven by a pulse-controlled a.c. converter with a plurality of frequency converters of equal rating but provide together the rated capacity of the machine. The machine has at least two pole pairs, and multiple phases with each phase subdivided into $n \geq 2$ individual phase sections. The individual phase sections of each phase of the machine are extensively magnetically decoupled relative to each other. A separate frequency converter is coupled to each of the phase sections. The machine includes means for clocking the frequency converters for the n phase sections out of phase by an angle of $2\pi/n$ relative to each other.

When the electrical machine is a synchronous machine energized electrically or by permanent magnets, the rating of the magnetic conductivity of the synchronous machine along its transverse axis is made to be less than along its longitudinal axis, according to the present invention. This reinforces the decoupling of the phase sections of each phase.

BRIEF DESCRIPTION OF THE DRAWINGS

The drawing figure illustrates a polyphase electrical machine constructed in accordance with an embodiment of the present invention.

DETAILED DESCRIPTION

The drawing illustrates a simplified exemplary embodiment of the invention, shown in the drawing as a two-phase machine with two pole pairs. Each phase is subdivided into two phase sections and each phase section is fed by a separate frequency converter.

Four slots, N1–N4, are assigned to the pole pair for the two phase sections I1, II1 of the phase I. The phase sections I1, II1 are separately fed by frequency converters UI1, UII1. Similarly, four slots, N5–N8, are assigned to the pole pair P2 for the two phase sections I2, II2 of the phase II. The phase sections I2, II2 are separately fed by frequency converters UI2, UII2.

A clock CK for clocking the separate frequency converters is shown coupled to the frequency converters UI1, UII1, UI2, UII2. The clock CK clocks the frequency converters for the n phase sections I1, II1, I2, II2 that are out of phase by an angle of $2\pi/n$ relative to each other.

To decouple the phase sections I1, II1 and I2, II2 of each phase P1, P2 of a polyphase machine, each one of which is fed by a respective separate frequency converter UI1, UII1, UI2, UII2, the respective phase sections are either configured in a two-part machine, or the pole pairs belonging to one another are wound alternately with the phase sections. The extensive decoupling of the phase sections I1, II2, and I2, II2 enables the individual frequency converters UI1 UII1 and UI2, UII2 that supply these phase sections to be adjusted separately. In synchronous machines, the decoupling of the phase sections I1, II1 and I2, II2 is improved by providing less magnetic conductivity along the transverse axis than along the longitudinal axis. The phase shift of the frequency converter clocking by the angle $2\pi/n$ for the n phase sections minimizes oscillating torques and noise.

What is claimed:

1. A polyphase electrical machine driven by a pulse-controlled a.c. converter with a plurality of frequency converters of equal rating and a total output equal to the requirements of the machine, comprising:
   means for forming at least two pole pairs;
   means for forming multiple phases in each pole pair with each phase subdivided into $n \geq 2$ individual phase sections;
   means for extensively magnetically decoupling the individual phase sections of each phase relative to each other;
   a separate frequency converter coupled to each of said phase sections; and
   means for clocking the frequency converters for the n phase sections out of phase by an angle of $2\pi/n$ relative to each other.

2. The machine of claim 1, wherein said machine is a synchronous machine energized electrically, and rating the magnetic conductivity of the synchronous machine along its transverse axis less than along its longitudinal axis.

3. The machine of claim 2, wherein each phase is subdivided into two individual phase sections.

4. The machine of claim 2, wherein the pole pairs belonging to each other are each wound alternately with the phase sections of a phase.

5. The machine of claim 1, wherein said electrical machine is a synchronous machine energized by permanent magnets, and the rating of the magnetic conductivity of the synchronous machine along its transverse axis is less than along its longitudinal axis.

6. The machine of claim 5, wherein the individual phases are each subdivided into two phase sections.

7. The machine of claim 5, wherein the pole pairs belonging to each other are each wound alternately with the phase sections of a phase.

8. The machine of claim 1, wherein the individual phases are each subdivided into two phase sections.

9. The machine of claim 1, wherein the pole pairs belonging to each other are each wound alternately with the phase sections of a phase.

* * * * *